(12) United States Patent
Cardelius et al.

(10) Patent No.: US 9,273,987 B2
(45) Date of Patent: Mar. 1, 2016

(54) CONTINUOUS PISTON FLOW METER

(75) Inventors: Erik Cardelius, Djursholm (SE); Mathias Eklund, Stockholm (SE)

(73) Assignee: EC Instruments AB, Djursholm (SE)

( * ) Notice: Subject to any disclaimer, the term of this patent is extended or adjusted under 35 U.S.C. 154(b) by 274 days.

(21) Appl. No.: 14/001,082

(22) PCT Filed: Feb. 23, 2012

(86) PCT No.: PCT/SE2012/000019
§ 371 (c)(1),
(2), (4) Date: Aug. 22, 2013

(87) PCT Pub. No.: WO2012/115562
PCT Pub. Date: Aug. 30, 2012

(65) Prior Publication Data
US 2013/0333464 A1  Dec. 19, 2013

(30) Foreign Application Priority Data

Feb. 25, 2011  (SE) ........................................ 1100127

(51) Int. Cl.
*G01F 3/14* (2006.01)
*G01F 3/16* (2006.01)
*G01D 5/347* (2006.01)

(52) U.S. Cl.
CPC ............... *G01F 3/16* (2013.01); *G01D 5/34746* (2013.01)

(58) Field of Classification Search
CPC .............. G01F 3/16; G01F 15/02; G01F 1/00
USPC ........................................... 73/239, 232, 861
See application file for complete search history.

(56) References Cited

U.S. PATENT DOCUMENTS

| | | | | | |
|---|---|---|---|---|---|
| 3,657,925 | A | * | 4/1972 | Gross | ...................... F16K 11/00 73/239 |
| 5,209,114 | A | * | 5/1993 | Lalin | .......................... G01F 3/16 73/248 |
| 5,440,925 | A | * | 8/1995 | Padden | ...................... G01F 1/90 73/1.19 |
| 7,783,434 | B2 | * | 8/2010 | Keese | ................... G01F 1/8422 702/189 |
| 2009/0097040 | A1 | * | 4/2009 | Robert | ............... G01D 5/34746 356/614 |

FOREIGN PATENT DOCUMENTS

| | | |
|---|---|---|
| DE | 10 2005 013 662 A1 | 9/2006 |
| FR | 2 707 003 A1 | 12/1994 |
| WO | WO 00/63075 A1 | 10/2000 |

OTHER PUBLICATIONS

Siretchi, Device for measuring small fluid flow rates, Fr2707003.*

* cited by examiner

*Primary Examiner* — Lisa Caputo
*Assistant Examiner* — Nigel Plumb
(74) *Attorney, Agent, or Firm* — Dickstein Shapiro LLP

(57) ABSTRACT

According to the present invention a flow meter is provided for measuring a fluid, comprising a measuring tube with a measuring piston movably arranged in said measuring tube, and elements for changing the direction of movement of the measuring piston in said measuring tube, wherein said measuring piston, when measuring, is designed to be moved in said measuring tube under the influence of said fluid. Sensor elements detect movement of the piston and the direction of movement in said measuring tube, and sensor elements detect when the piston is situated in at least one of its reversing areas before the measuring piston has reached the extreme point of the reversing area, so as to afford a substantially continuous flow detection for said fluid.

21 Claims, 8 Drawing Sheets

CONTINUOUS PISTON FLOW METER

TECHNICAL FIELD

The invention relates generally to a meter for gas and liquid flow.

BACKGROUND

Accurate flow measurement can be performed using a piston which moves in a tube of known cross-sectional area. By admitting a gas or a liquid, hereinafter referred to as a fluid, on one side of the piston, for example by means of a valve arrangement, it is possible to take a measurement of the displaced volume and hence the rate of flow as the piston moves from one side of the tube to the other. The movement of the piston is measured over time and, if the diameter of the tube is known, can be converted to a rate of flow. When the piston reaches the end of the tube, the gas is led past the measuring tube, the piston being returned to its starting position. Such a measurement becomes only a spot check on the actual flow. It would be desirable to be able to perform a continuous flow measurement, since the principle of measuring flow with a piston affords outstanding precision. A valve arrangement may be used to change the direction of movement of the piston, so that it reciprocates, that is to say moves forwards and backwards, in the measuring tube. By continuously measuring the movement of the piston it is possible to perform a continuous flow measurement. This type of flow meter still has the problem, however, that an interruption in the measurements occurs when the piston reaches an extreme point and thereby stops.

Nor, if the piston is situated in either of its limit positions, will it be possible to move the piston if the fluid is admitted to the wrong side thereof.

A need therefore exists for an improved flow meter.

U.S. Pat. No. 5,440,925 Padden et al. discloses a solution of the aforesaid type, which consequently cannot be used for continuous measurement, and describes both a piston flow meter which measures only when the piston is moving in one direction, and a meter in which the piston moves in both directions. In both cases the movement is detected by means of an optical encoder strip, which is fixed to the piston.

U.S. Pat. No. 5,209,114 Lalin et al. describes a non-continuous piston flow meter in which the limit positions of the piston are detected by two pairs of optical transmitters and receivers at each end of a measuring tube. A beam of light is sent through the measuring tube, which is made of glass, and is cut off by the piston when the latter is situated in the limit positions.

SUMMARY OF THE INVENTION

The object of the invention is to provide a continuous and accurate flow meter, comprising a reciprocating measuring piston, which solves the problems outlined above.

A further object of the invention is to provide a flow meter comprising a reciprocating measuring piston which allows measurement of the flow regardless of the direction of flow through the flow meter.

According to the present invention a flow meter is provided for measuring a fluid, comprising a measuring tube with a measuring piston movably arranged in said measuring tube, and elements for changing the direction of movement of the measuring piston in said measuring tube, wherein said measuring piston, when measuring, is designed to be moved in said measuring tube under the influence of said fluid. Sensor elements detect movement of the piston and the direction of movement in said measuring tube, and sensor elements detect when the piston is situated in at least one of its reversing areas before the measuring piston has reached the extreme point of the reversing area, so as to afford a substantially continuous flow detection for said fluid.

By admitting a fluid such as a gas or liquid alternately to respective sides of the piston and measuring the forwards and backwards movement of the piston in the measuring tube under the influence of the fluid over time, it is possible, from the diameter or cross-sectional area of the measuring tube, to measure the displaced volume and thereby the rate of flow as the piston moves from one side of the tube to the other. By detecting when the piston is situated in a reversing area in accordance with the present invention, the switching of the direction of flow of the fluid in the measuring tube can occur before the piston actually reaches an extreme point, which has the advantage that measurement of the flow can proceed substantially continuously, since the piston does not first have to come to a standstill for a limit position to be detectible.

Changing the direction of movement of the fluid and thereby of the piston in said measuring tube can be done, for example, by means of a valve arrangement.

According to one embodiment, a stop element, which when compressed allows the movement of the piston and the direction of movement to be detected, is introduced in order to allow the fluid to be admitted to the correct side of the piston when the piston is in either limit position on commencement of the measurement.

When measuring, the direction that represents the intended direction of movement of the piston is changed to an opposite direction in said measuring tube, whilst the direction of movement of the piston is changed by means of said elements for changing the direction of movement of the measuring piston. In this way it is possible, for example, for an aggregate volume to be determined by accumulating the flow over time.

In said measurement, piston movement in an opposite direction to the intended direction of movement of the piston can be subtracted from the cumulative movement of the piston, in order to take account of piston movements that occur in an opposite direction to the intended direction of movement, for example due to compression/decompression of the medium that is being measured, and/or other unwanted piston movements.

When changing the direction of movement of the piston, control signals may be emitted for controlling said elements for changing the direction of movement of the measuring piston, and the intended direction of movement of the piston in said measurement can be changed a first time after said control signals have been emitted to said elements for changing the direction of movement of the measuring piston. In this way account can be taken of switching times by said elements for changing the direction of movement of the measuring piston, where said elements may consist of a first and a second changing element acting at a first and a second end respectively of said measuring tube, where said respective changing elements, for example, may consist of at least one respective valve. Furthermore, said first time may represent a switching time of said changing elements, therefore allowing this switching time to be taken into account so as to afford a more correct measurement. The switching time for the respective changing element such as the respective valve may vary, it being possible to determine said first time on the basis of the respective switching time in order to take account of switching times of different lengths. For example, if a switching time for a first of said changing elements exceeds the switching time for a second of said changing elements, a control signal may be emitted to said second said changing element with a delay corresponding to said difference in switching time, thereby making it possible to achieve simultaneous switching of said changing elements.

If an activation or deactivation time is different for said first and second changing elements, said changing elements may be arranged so that their switching time when changing the direction of movement of the measuring piston is substantially the same. That is to say the changing elements are arranged so that they both perform an activation simultaneously or a deactivation simultaneously, therefore making it possible for the switching time, and thereby said first time, to differ between the two ends of the measuring tube when changing the direction of movement of the measuring piston.

The invention also relates to a corresponding measuring method.

DESCRIPTION OF THE FIGURES

The invention is explained in more detail below with reference to the drawings attached, in which.

DETAILED DESCRIPTION OF THE INVENTION

Figure 1:
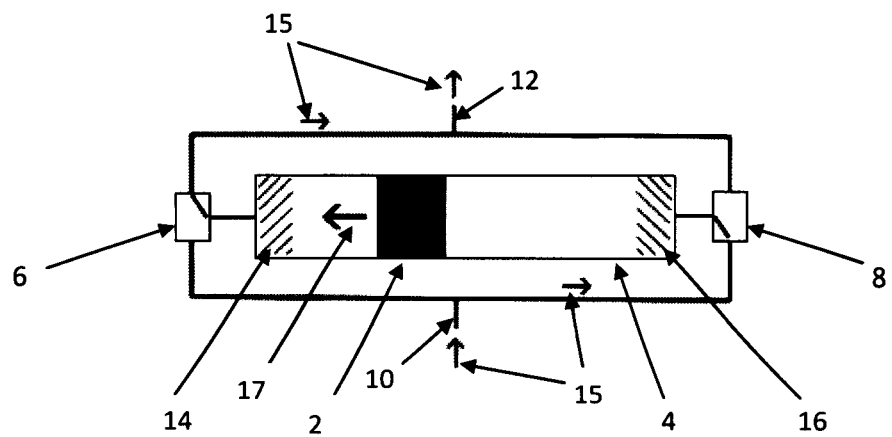
FIG. 1 shows a piston flow meter with the valves in a first state.
Figure 2:
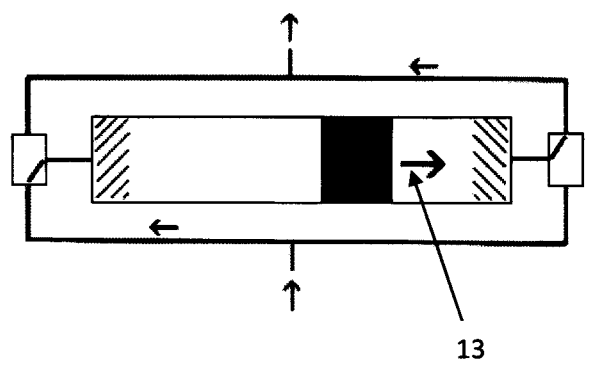
FIG. 2 shows a piston flow meter with the valves in a second state.

FIGS. 1 and 2 show an exemplary embodiment according to the present invention with a measuring piston 2 located in a measuring tube 4. Fluid is fed into and out of the measuring tube through two three-way valves 6 and 8, which can each be set to two different states. The fluid is fed to the valves from the inlet 10 and from the valves to the outlet 12. The reversing areas of the piston are shown as dashed areas 14 and 16. The direction of flow of the fluid is shown by arrows 15. FIG. 1 shows both of the valves 6 and 8 in their first state. The movement of the piston is then according to the arrow 17 towards the left in the figure.

When the piston has reached its reversing area 14, the state of the valves is changed to their second state, which has occurred in FIG. 2. The movement of the piston is then according to the arrow 13 towards the right in the figure. When the piston reaches the right-hand reversing area 16, the state of the valves is changed to their first state, whereupon the sequence is repeated until the measurement is completed. This gives a reciprocating movement of the piston. According to the present invention, continuous measurement of a fluid flow is allowed by detecting when the measuring piston reaches the respective reversing area 14, 16, wherein, with the aid of the valves 6, 8, the direction of movement of the piston can be changed before or precisely when the piston reaches the respective extreme point where further piston movement is no longer possible, such as when the piston reaches either end of the tube, or alternatively the tube may comprise some type of element that stops the piston before the end of the tube is reached, for example a heel or the like, but still after the piston has entered the reversing area.

Linear movement and the direction thereof can be detected by means of a so-called encoder. The encoder may consist of a strip with slits passing through it, which form a grid. The slits may be placed with a center-to-center distance equal to twice the slit width. An optical transmitter and receiver are placed on respective sides of the strip. When the strip moves relative to the transmitter and the receiver, a pulse sequence is generated by the receiver, which provides information on the magnitude of the movement in that the distance between the slits is known. By introducing a further transmitter and receiver, the generated pulse sequence of which is in quadrature with the pulse sequence generated by the first pair, information can also be obtained on the direction of the movement.

The beam of light that is used should be smaller than the width of the slits. In order to reduce the demands placed on the capacity of the transmitter to produce, or the capacity of the receiver to detect, a narrow beam of light when narrow and closely placed slits are used, a stationary grid with corresponding slits may be introduced. A varying luminous intensity is thereby formed over a larger area when the movable strip is moved. An encoder with a stationary grid according to the usages outlined above is said to be "of moiré type".

Figure 7:
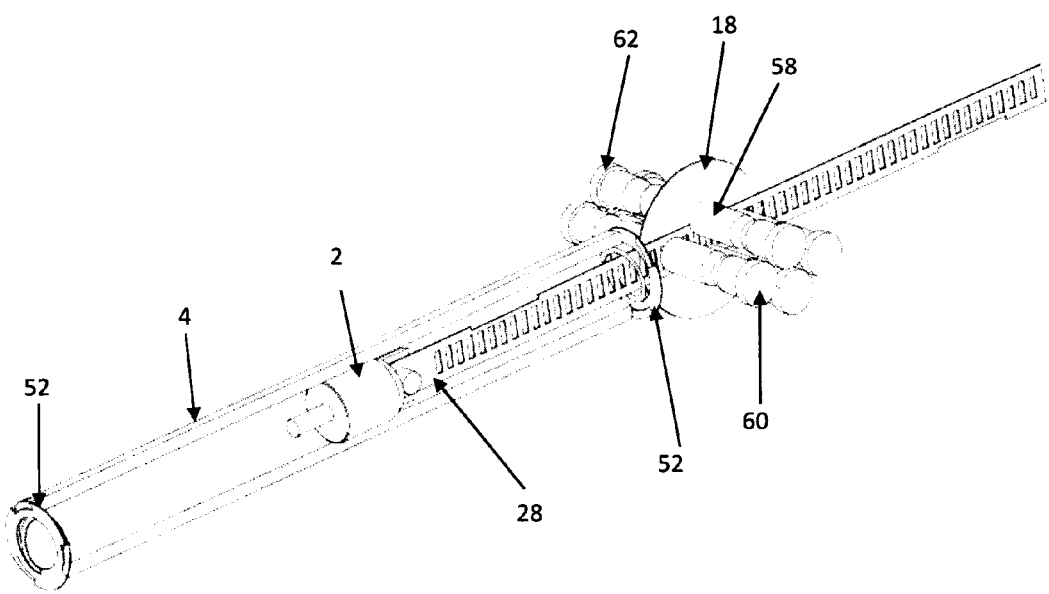
FIG. 7 shows an overview of all the constituent parts of the invention.

FIG. 7 shows an exemplary embodiment of the present invention. A measuring piston 2 is placed in a measuring tube 4 (here shown in cross section). The piston is coupled to a movable strip 28 with a grid, which moves over a stationary disk 18 with a grid. These two parts together constitute an encoder. FIG. 7 further shows optical waveguides 58 (in total there are eight of these, not all of them visible in the figure) together with optical transmitters 60 and optical detectors 62. Other parts in FIG. 7 are described further below.

Figure 3A:
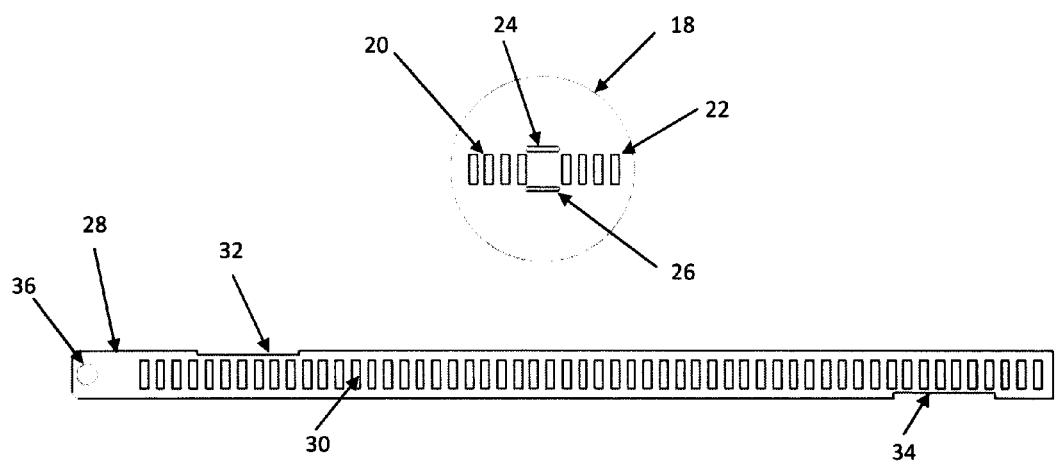
FIG. 3A shows the stationary grid of the encoder and a movable grid.

FIG. 3A shows the thin disks that make up the grid of the encoder. In the stationary disk 18 there are through-slits in a first group 20 and in a second group 22, together with hole 24 and hole 26. The second group of slits 22 is placed so that the signals generated by these are in quadrature with the signals generated by the first group 20.

In the movable disk, or the strip, 28 there are slits 30 together with notches 32 and 34. As shown in FIG. 7, the strip is fixed to the piston with the hole 36.

Figure 4A:
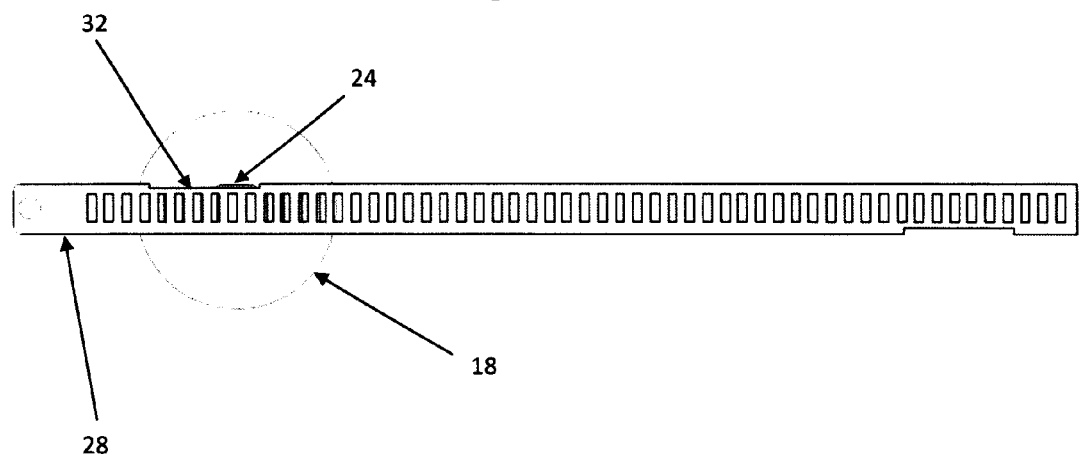
FIG. 4A shows parts of the encoder placed one on top of another in its first reversing position.

FIG. 4A shows the strip 28 placed on top of the disk 18. The movable strip is placed as it is situated when the piston reaches its first reversing area 14, 16. The notch 32 then affords free passage for a beam of light through the hole 24.

When the strip 28 moves relative to the disk 18, free passages are formed for a beam of light through the slits 30 and 20 respectively 22.

Figure 4B:
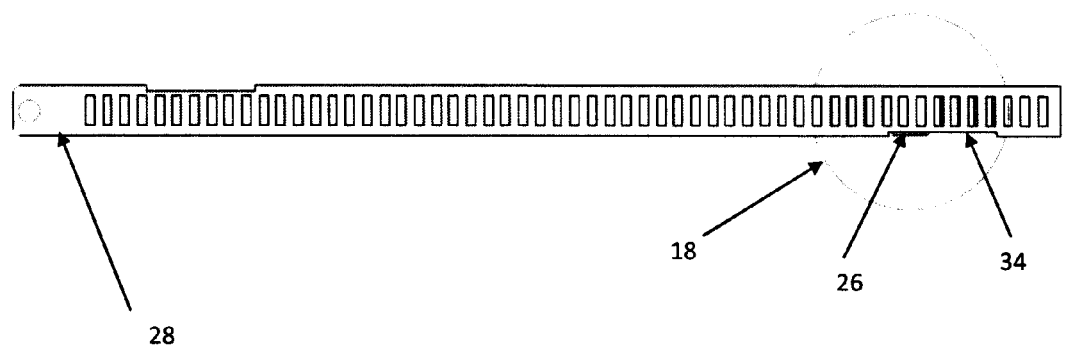
FIG. 4B shows parts of the encoder placed one on top of another in its second reversing position.

FIG. 4B also shows how the movable strip 28 is placed on top of the stationary disk 18 when the piston is situated in its second reversing area. The notch 34 then affords free passage for a beam of light through the hole 26.

In one embodiment, the direction of the piston is changed immediately when light is detected through the notch 32 and the hole 24 or the notch 34 and the hole 26. In another exemplary embodiment the direction of the piston is changed only once one slit passage or a number of slit passages have been detected through the slits 30 and 20 respectively 22, a number which may depend on the placing of the notches 32 and 34. However, the direction of the piston is always changed before or precisely when the piston reaches its respective limit position, in order to allow continuous measurement without the piston stopping and remaining immobile relative to the limit position, when it should actually have continued to move in the same direction if the limit position had not been reached. If changing of the piston direction occurs at the limit position, according to the present invention this still means that changing of the piston direction occurs on the basis of a calculated limit position, for example by counting the number of slits moved by the piston after the reversing area is detected. For example, the reversing area may be any suitable number of slits long. In this way, changing of the piston direction can occur precisely when it is calculated that the piston is reaching its limit position, and not just when the limit position, for example, has been detected through cessation of the piston movement, in which case continuous measurement cannot occur, since it must first be detected that the piston has stopped. However, changing of the piston position preferably occurs before the limit position is reached.

Figure 5A:
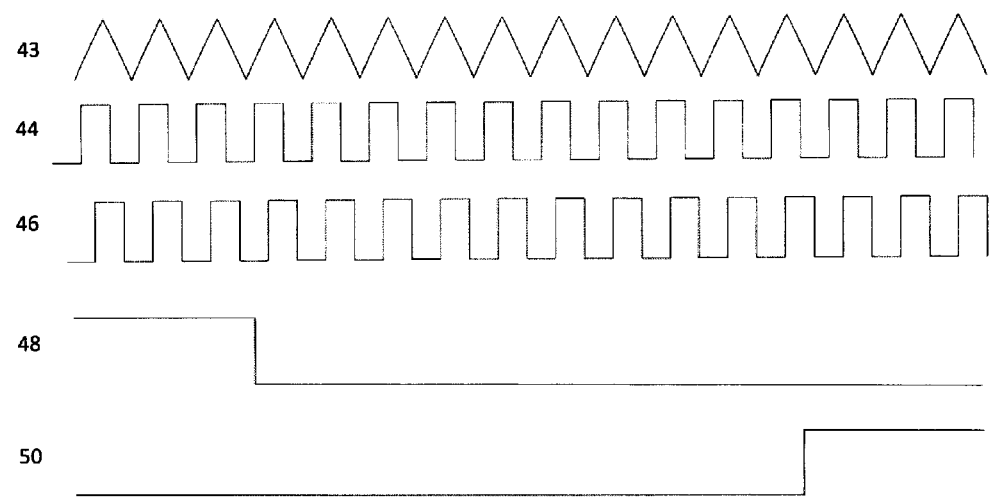
FIG. 5A shows the signals which the encoder generates.

FIG. 5A shows the signals which the encoder generates when the piston is moving from one limit position to the other. The light that is received in the optical detector, for example a phototransistor, produces an unprocessed signal 43, which has a saw-tooth profile. The groups of slits 20 and 22, together with the slits 30, generate the two pulse sequences 44 and 46 respectively, as they appear when the unprocessed signals have been digitized. The pulse sequence 46 is in quadrature with the pulse sequence 44, which provides information on the direction of movement of the piston. Once the level of the signal 44 has been adjusted, for example from high to low, subsequent signal change in the signal 46 provides information on the direction of the movement. A change of signal 44 from low to high followed by a change of signal 46 from high to low means a movement towards the left in the figure and vice versa.

The holes 24 and 26 together with the notches 32 and 34 generate the signals 48 and 50 respectively, which provide information on when the piston is situated in the respective reversing area (14 and 16).

Figure 3B:
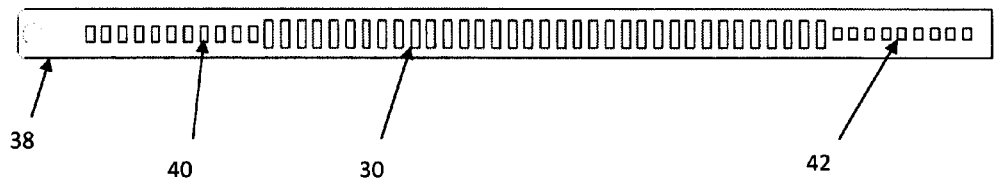
FIG. 3B shows an alternative movable grid.

FIG. 3B shows an alternative movable strip 38, in which there are slits 30 and two groups of slits of differing height (40 and 42). The slits in the movable part 38 are of differing height at least at one of the ends, in this example two different lower heights. When the piston is situated in the reversing area, the signals corresponding to 44 and 46 from the encoder will be modified in their amplitude, which provides information that the piston is situated in the respective reversing area. The number of optical transmitters, optical detectors and optical waveguides needed is thereby halved.

Figure 5B:
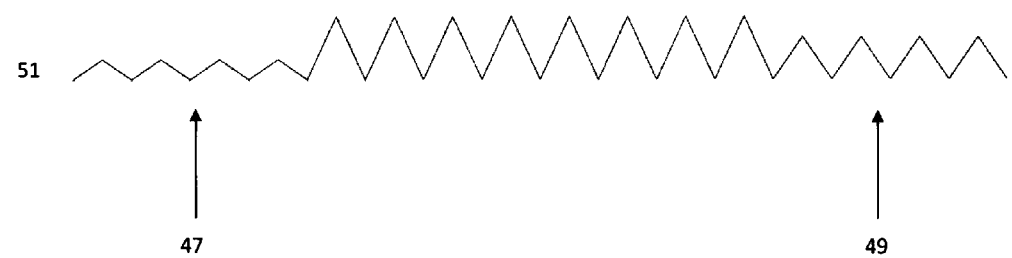
FIG. 5B shows the signal from an alternative encoder.

FIG. 5B shows an unprocessed signal 51 which derives from the alternative encoder strip 38, in which the groups of slits 40 and 42 of differing height generate a signal of differing amplitude, 47 and 49 respectively, which provides information on when the piston has reached the respective reversing area.

In order to achieve a small measurement error in the reversal, the resolution of the encoder should be high. Each flank of the pulse sequence 44 or 46 is counted as a certain quantity of volume displaced by the piston (which can be calculated, for example, from a knowledge of the cross-sectional area of the piston). If the piston reverses between two flanks, a maximum error in the measured volume equal to half a slit width is obtained. In order to minimize the measurement error at the reversals, the resolution of the encoder (the slit width in the present example) should be as high as possible.

However, this increases the risk that oscillations of the piston, for example during the reversals, will be incorrectly interpreted as displaced volume. There is a risk that the piston may begin to bounce on the spring, to which the gas in the measuring tube may be likened, when the piston suddenly changes its direction of movement. The piston is freely movable in the measuring tube with very little friction against the surrounding parts. In the event of a sudden change in the direction of movement of the piston, the piston may start to oscillate, and therefore move to and fro, which can lead to an incorrect flow being measured, since a number of flanks may be detected without the piston in fact having moved in the tube.

If a measured movement is converted directly into a displaced volume, a cumulative error will occur in the event of oscillations. In the absence of any directional information, all flanks are counted as a certain quantity of additional displaced volume. Without the facility for handling oscillations, for example during reversals of the piston, the measuring accuracy cannot be maintained in situations where piston oscillations occur. An oscillation of the piston which moves over a plurality of slits would then give too high a measured value for the flow, since movement in a negative direction is also added to the total movement. If the piston is used to measure the total volume that has passed through the flow meter, this measuring method is inadequate, since movements are added to the displaced volume, irrespective of the direction.

As has emerged above, according to an exemplary embodiment of the present invention a further transmitter and receiver pair is used in quadrature (or phase-offset by another suitable number of degrees), which generates the curve 46 according to the above. By combining information from the curve 44 and 46, information can also be obtained on the direction of the piston. When the piston is being moved in one direction, the pulses from the further transmitter and receiver pair will have a 90° (or other suitable number of degrees) phase delay, whilst in the opposite direction of movement the pulses will have a phase lead. Each detected change in volume can thereby be either added to or subtracted from the total volume, depending on the direction, which also makes it possible to avoid the problem of oscillations, since this allows correct and continuous measurement, despite the fact that the piston is momentarily able to move in a different direction from the main direction of the flow through the flow meter.

In order to be able to add to or subtract from the measured movement correctly, a positive direction for the piston must be defined, that is to say the direction that constitutes the intended direction of movement of the piston in the measuring tube. First a positive direction of flow into the flow meter must be defined. For example, a flow in towards the inlet 10 in FIG. 1 may be defined as the positive direction. What is defined as the positive direction of the piston then depends on the state of the valves. In FIG. 1 movement according to the arrow 17 is then in a positive direction, whilst in FIG. 2 movement according to the arrow 13 is in a positive direction. The point in time when the piston is actually reversing, however, is normally not the same as when the control signals of the valves are being changed, since there is often a time delay in the working of the valves and a mechanical inertia in the movement of the piston. The time at which the control signal of the valves is changed should therefore not be the controlling factor in determining when the direction, which is reckoned to be the positive direction of the piston, is to be changed (and hence also conversely the negative direction, that is to say the direction in which the piston movement is to be subtracted from the measuring result).

One method is to use directional information of the encoder to determine the actual reversal point of the piston, that is to say the point which is situated closest to the relevant limit position. The direction reckoned to be the positive direction (and correspondingly the negative direction) of the piston is changed after such an actual reversal point. This method is suitable for non-compressible media such as a liquid.

If the medium is compressible, as is the case with a gas, a compression of the medium is obtained on the basis of the piston movement once the state of the valves has been changed. That is to say, despite the fact that the valves have switched, the piston will continue to be moved some distance further in the same direction whilst the medium is compressed, before the piston actually changes direction. Once the piston has changed direction, a corresponding decompression of the medium occurs. Movement of the piston during compression and subsequent decompression of the medium must be subtracted from the total movement, since this piston movement is not matched by a corresponding actual flow. This is brought about by changing the direction of movement of the piston, which in the calculation is reckoned to be the positive direction of movement of the piston, at the point in time when the state of the valves is changed. Piston movement when the medium is compressed will then be subtracted from the total movement, whilst piston movement during subsequent decompression is added to the total movement, the aggregate piston movement during compression and decompression therefore giving a net contribution which is equal to zero, and thereby not giving rise to an erroneously high volume calculation.

Figure 9:
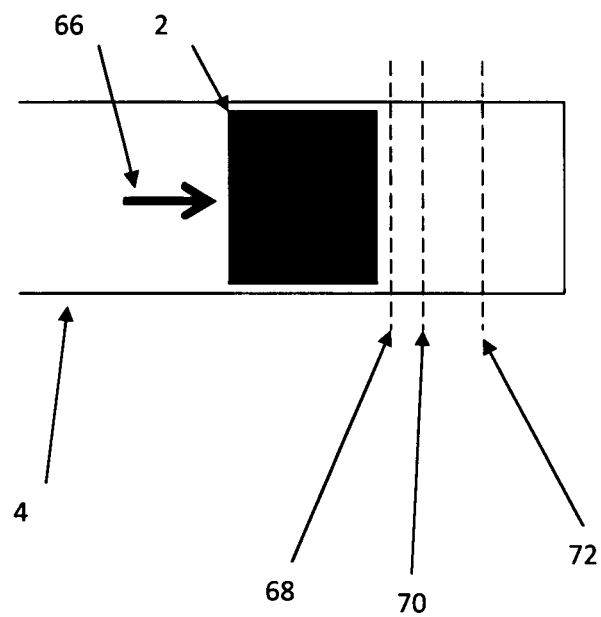
FIG. 9 shows a schematic view of the piston reversal sequence.

FIG. 9 schematically shows the piston 2 in movement with a direction of movement according to the arrow 66. Also shown are the indicated position 68 of the piston 2 at the point in time when the control signal(s) of the valves, such as the valves 6, 8 in FIG. 1, for example, are changed with the aim of changing the direction of movement of the piston. The position in which the piston will be situated when the valves actually switch, that is to say the position in which the direction of movement of the piston, in the calculation reckoned to be the positive direction of movement, is changed, is represented by the position 70, and the actual reversal point of the piston is represented by 72.

When the piston moves between positions 68 and 70, the control signals to the valves have been changed, but the valves have accordingly not yet switched. When the piston moves between positions 70 and 72, the valves have switched, the medium being compressed as long as the piston movement is as shown by the arrow 66.

The state of the valves is changed a certain time after the control signal is changed, due to electrical and mechanical delays. This time is referred to as the switching time of the valves. What is reckoned to be the positive direction of movement in the movement of the piston, that is to say changing from the direction 66 in FIG. 9 to an opposite direction, must therefore not be changed at the position 68 in which the piston is situated when the control signals are changed, but only a certain time after changing of the control signal of the valves, this time being dependent on the valves used, and therefore representing the piston position 70 in which actual switching of the valves, and hence the direction of flow, occurs. The switching time of the valves, for example, may be known, for example from product specifications, or it may be calculated or measured during a calibration process, for example.

Furthermore, certain types of valves may have different activation and deactivation times. In one embodiment therefore the valves 6 and 8 are connected in such a way that in their de-energized state they conduct the fluid as shown in FIG. 1. When a voltage is applied to the two valves 6, 8 the fluid is led as shown in FIG. 2. The switching time for activation can thereby be used as a delay from the sending of control signals, following which what is reckoned to be the positive piston direction is changed when the piston moves to the left in FIG. 1, and the switching time for deactivation can be used as a delay when the piston moves to the right.

Furthermore, simultaneous control signals to the valves will result in simultaneous switching.

In a further embodiment the valves are connected in such a way, for example, that only one valve, such as the valve 6, for example, is energized when the fluid moves as shown in FIG. 1. The control signal to the one valve is then delayed by a time which is the difference between the activation and deactivation time for the type of valve, where activation may be faster or slower than the deactivation. The two valves are thereby made to change state simultaneously. The activation or deactivation time of the valves, whichever is the longer, can thereby always be used as delay before changing the positive piston direction once the first control signal has been sent. For example, activation, that is to say energizing, may be faster, so that in this example the deactivation time can be used as delay, after which what is reckoned to be the positive piston direction can be changed.

It may also be that despite the use of similar changing elements, such as valves, for example, having the same specification, manufacturing tolerances, for example, mean that the changing elements will still have different activation and/or deactivation times, regardless of how they are connected into the system. In such situations, therefore, account is also preferably taken of individual differences between different changing elements, which can be determined, for example, through actual measurement of the respective changing elements, either at the manufacturing stage or at a suitable later time.

Correct measurement of the through-flow volume as outlined above means that the meter can also be used for the dosing of a certain preset volume. The valves 6 and 8 can be set so that the inlet is closed when the volume is reached.

The piston with associated encoder is freely movable in the measuring tube. When the instrument is shut off, or when the valves 6 and 8 have been set so that the inlet 10 is isolated from the measuring tube, the piston can be moved to an unknown position. The piston may also end up in the limit positions. This can happen, for example, due to gravity or because fluid is admitted to either side of the piston.

When starting up the instrument, or when connecting the flow to the measuring tube, information is needed on the position of the piston, so that the valves can be set to the correct state, provided that the main direction of the flow is known. If the piston is in the reversing area 14, that is to say when detection has been performed by corresponding sensor, and the direction of the flow is as indicated by the arrows 15 in FIG. 1, the valves 6 and 8 will be set as shown in FIG. 2, and if the piston is in the reversing area 16, the valves will be set as shown in FIG. 1.

In the solution described above, both reversing areas of the piston are detected. In an alternative embodiment the number of flanks is counted from the detection of a reversing area and when a specific number has been counted the piston will have reached its second reversing position and the state of the valves is changed. By calculating how far the piston has moved from detection of the reversing area, it is possible to manage with just one reversing area sensor. If the piston is not detected in the reversing area when starting, the valves are set so that the piston moves towards that direction. It is assumed above that the main direction of the flow through the flow meter is known. If the main direction is not known, this may be determined, for example, by means of the valve positon and directional information from the encoder (see below).

Furthermore, the flow meter has been described above for a flow in a main direction through the flow meter. In an alternative embodiment a bidirectional flow meter with no defined main direction of the flow is used. In order to allow starting of a bidirectional flow meter (which is not dependent on a defined main direction of the flow), both piston reversing positions should be indicated. In addition, information must be available on the direction of the flow. The directional information is normally obtained from the encoder with its phase-offset transmitters and receivers. Where the piston is in a limit position when starting up the instrument, it is not possible to detect either movement or direction if the valves are set so that the piston is pressed towards the limit position due to the prevailing direction of the flow. According to one embodiment the valves can be switched after a certain time if no movement is detected. According to another embodiment of the present invention, detection of the direction of flow is permitted regardless of the position of the piston. Introducing a flexible limit stop, which can be compressed under the force of the fluid when this is admitted to the measuring tube, allows a movement of the piston. It is thereby possible to determine the direction of the flow through the flow meter and the state of the valves can be changed so that the piston moves away from the relevant limit position. The limit stop should have a spring force of a magnitude such that, under vertical loading, compression under the weight of the piston is negligible and at the same time it should be so slight that a compression due to the flow can occur without an undue buildup of pressure. The flexible limit stops may take the form, for example, of springs which have been cut from a plane sheet. Helical springs are another alternative. Yet another alternative is a limit stop composed of an elastomer.

An arrangement, which provides a force in the opposite direction to the movement of the piston in the limit positions, may also be introduced as a flexible limit element. This may take the form of opposing magnets, for example, of which one magnet is fixed to the piston and magnets with an inverse magnetic field are placed in the ends of the measuring tube.

Figure 6:
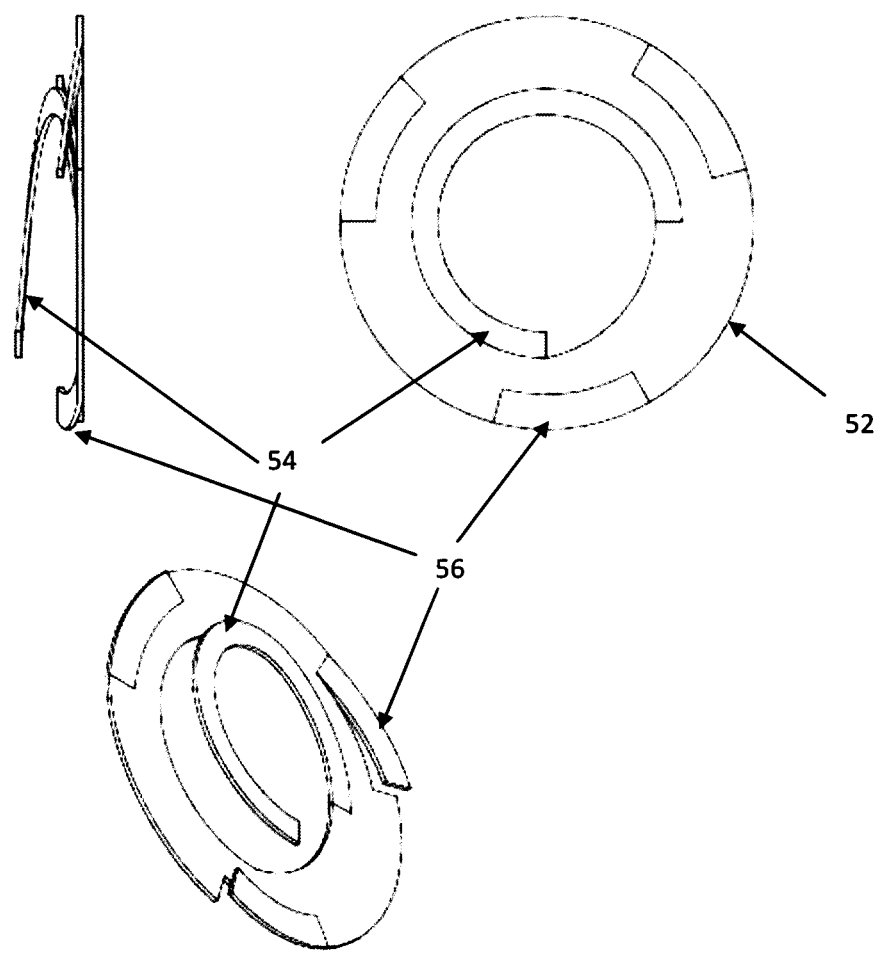
FIG. 6 shows a flexible limit stop in the form of a spring.

FIG. 6 shows three different views of an example of a flexible limit stop in the form of a spring 52. The spring is made of a plane material, for example a sheet metal. A tongue is cut out and bent out of the plane of the sheet and forms a spring element 54. A number of smaller tongues are similarly cut out and bent out and form the spring elements 56.

FIG. 7 shows the spring placed against each end of the measuring tube 4. The piston 2 will be able to rest against the spring element 54 if the flow meter is in a deenergized state. When starting up the instrument, the spring element 54 can allow a movement of the piston if the valves are set for such a direction. It is thereby possible to obtain directional information from the encoder and the valves can be set to a suitable state.

The spring elements 56 position the spring 52 against the end of the measuring tube. Any manufacturing variations in respect of the longitudinal dimension of the measuring tube as a result do not affect the distance for which the piston can be moved before it reaches the limit stop. The measuring tube 4 is shown in cross section in FIG. 7.

The following is an example of a method for controlling the state of the valves during starting of the flow meter and during continual operation, based on signals measured by the encoder:

If the piston is situated in a reversing area and the movement is in the same direction as the reversing area in question, the state of the valves is changed.

Figure 8:
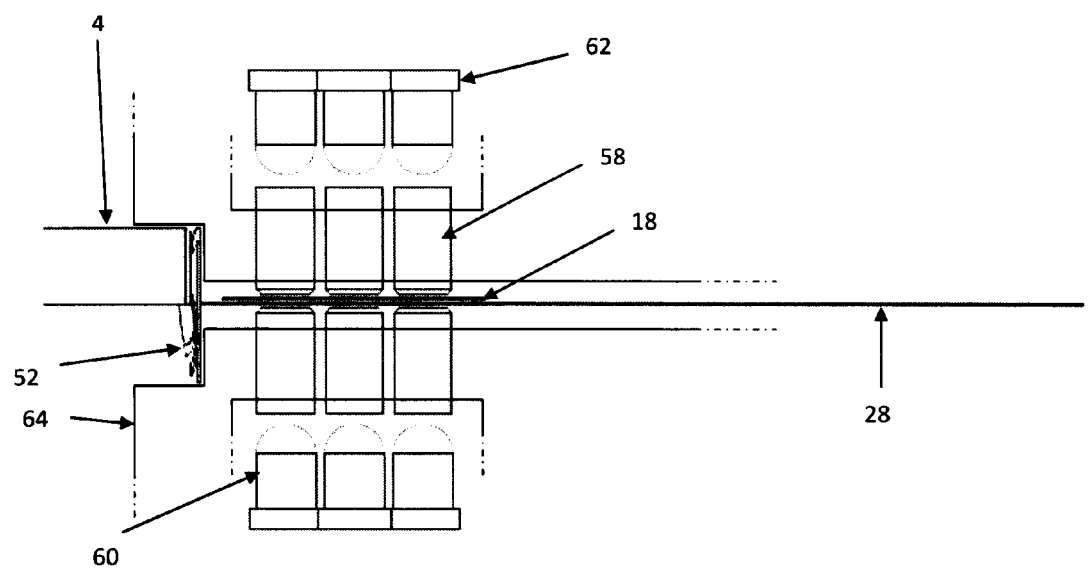
FIG. 8 shows a detailed view of the constituent parts of the sensor.

FIG. 8 shows another view of the exemplary embodiment shown in FIG. 7. Also shown here are parts of the meter housing 64, in which the optical waveguides 58 are fitted.

The path traveled by the light through the fluid, the flow of which is to be measured, can be minimized, since the light in principle only needs to pass through the stationary disk 18 and the movable strip 28. Even fluids with a low transparency can thereby be used in the flow meter. Detecting the piston by means of a beam of light transversely through the measuring tube, as in the prior art, is not feasible when measuring opaque fluids.

Placing optical waveguides 58 at a small distance from parts 18 and 28 of the encoder gives a very low sensitivity to the transparency of the fluid. The optical waveguides also have the function of mechanically controlling the movable part 28 of the encoder in the direction of rotation of the piston and are advantageously composed of glass which has good mechanical wear characteristics and is chemically resistant. A further function of the optical waveguides is to separate the optical transmitters and optical detectors from the fluid, so that these do not need to be made from material compatible with the fluid.

In order to be able to measure flow in opaque fluids, the reversing position sensors are therefore designed as an integral part of the encoder (32 and 24 or 34 and 26) having a short optical path through the fluid.

In alternative embodiments, the reversing position sensors may be of a type other than an optical type. For example, magnetism may be used. Parts of the encoder strip can be magnetized and when these areas pass respective Hall sensors they provide an indication that the piston has reached the reversing areas. Alternatively the areas may be magnetized with a different polarity, which provides information on the respective reversing area with the aid of just one Hall sensor. Mechanical switches may also be used.

In alternative embodiments, the sensor for determining movement and direction may be of a type other than an optical type. For example, a type of sensor which gives the absolute position may be used, making it possible to detect the reversing area from the absolute position. As examples of these, a magnetic sensor of the type used in digital slide calipers may be used. Furthermore an encoder strip, for example, may be used with a coding such as the slits 30 described above for detecting relative movement, whilst another coding may be used for determining the position regardless of the piston position and not just in the reversing area as described above.

REFERENCE NUMERALS 2 measuring piston
4 measuring tube
6 three-way valve
8 three-way valve
10 inlet
12 outlet
13 direction of movement of the piston
14 reversing area
15 direction of flow
16 reversing area
17 direction of movement of the piston
18 stationary encoder disk
20 group of slits
22 group of slits
24 hole
26 hole
28 movable encoder strip
30 slits 32 notch
34 notch
36 hole
38 alternative movable encoder strip
40 group of slits of differing height
42 group of slits of differing height
43 unprocessed signal
44 pulse sequence
46 pulse sequence
47 part of signal of differing amplitude
48 signal for reversing area
49 part of signal of differing amplitude
50 signal for reversing area
51 unprocessed signal alternative encoder strip
52 spring
54 spring element
56 spring element
58 optical waveguide
60 optical transmitter
62 optical detectors
64 meter housing
66 direction of movement of the piston
68 piston position at changing of control signal of the valves
70 piston position at valve switching
72 piston reversing position

The invention claimed is:

1. A flow meter for measuring a fluid, comprising a measuring tube with a measuring piston movably arranged in said measuring tube, and elements for changing the direction of movement of the measuring piston in said measuring tube, and wherein said measuring piston, when measuring, is designed to be moved in said measuring tube under the influence of said fluid,
further comprising:
sensor elements for detecting movement of the piston and the direction of movement in said measuring tube, and
sensor elements for detecting when the piston is situated in at least one of its reversing areas before the measuring piston has reached the extreme point of the reversing area, so as to afford a substantially continuous flow detection for said fluid;
wherein the elements for changing direction of movement of the measuring piston can be set to a first state and a second state, wherein the direction of movement of the measuring piston is changed by changing state of the elements for changing the direction of movement of the measuring piston,
wherein, when measuring, the direction that represents the intended direction of movement of the piston is changed to an opposite direction, when changing state of said elements for changing the direction of movement of the measuring piston, wherein a movement in an opposite direction to the intended direction of movement of the piston is designed to be subtracted from the cumulative movement of the piston.

2. A flow meter as defined in claim 1, further comprising elements which, when it has been detected that the piston is situated in at least one of its reversing areas, change the direction of movement of the piston before the measuring piston has reached the extreme point of said reversing area.

3. A flow meter as defined in claim 1, further comprising elements for detecting changes of direction of said piston during changing of the direction of movement of the piston.

4. A flow meter as defined in 1, further comprising elements for detecting oscillatory changes of direction of said piston during changing of the direction of movement of the piston.

5. A flow meter as defined in claim 3, wherein, when detecting the flow, movement in an opposite direction to the intended direction of movement of the piston is subtracted from the cumulative movement of the piston.

6. A flow meter as defined in claim 1, wherein said sensor elements for detecting when the piston is situated in at least one of its reversing areas consist of sensor elements for determining the absolute position of said piston.

7. A flow meter as defined in claim 1, wherein said sensor elements for detecting the movement of the piston and the direction of the movement consist of an optical encoder, wherein the optical encoder comprises an encoder strip, wherein said encoder strip comprises code elements in the form of slits with a first distance between said slits, and wherein the encoder strip runs along a second encoder element with stationary slits.

8. A flow meter as defined in claim 7, wherein said encoder strip runs between a first optical transmitter and a first receiver arranged on the opposite side, wherein said encoder strip runs between a second optical transmitter and a second receiver arranged on the opposite side, wherein a first signal that is generated by said first transmitter/receiver has a phase offset relative to a second signal that is generated by said second transmitter/receiver.

9. A flow meter as defined in claim 8, wherein the reversing position sensors consist of separate code elements on the encoder strip.

10. A flow meter as defined in claim 8, wherein the reversing position sensors are integrated into the movement-and direction-sensing part of the encoder as slits of a differing height.

11. A flow meter as defined in claim 8, wherein the number of slits is counted from the detection of a reversing area, and wherein the measuring piston has reached its second limit position when a specific number of slits has been counted, wherein the direction of movement of the piston is changed.

12. A flow meter as defined in claim 1, further comprising elements for dosing a first volume by determining the total movement of the measuring piston.

13. A flow meter as defined in claim 1, comprising a stop element in at least one of the limit positions of the measuring tube, wherein said stop element, when said piston is situated in said limit position, allows a detectible movement of said piston under the influence of said fluid in the direction towards said limit position, so as to permit detection of the direction on commencement of the flow measurement with the piston in said limit position.

14. A flow meter as defined in claim 1, wherein said sensor elements for detecting the direction of movement of the measuring piston in said measuring tube comprise elements for detecting the direction of the movement regardless of the prevailing position of said measuring piston in said measuring tube.

15. A flow meter as defined in claim 1,
wherein, when changing the direction of movement of the piston, control signals are designed to be emitted for controlling said elements for changing the direction of movement of the measuring piston, and
wherein the intended direction of movement of the piston in said measurement is designed to be changed a first time after said emission of said control signals for controlling said elements for changing the direction of movement of the measuring piston.

16. A flow meter as defined in claim 15, wherein said first time represents a switching time of said elements for changing the direction of movement of the measuring piston, and said elements for changing the direction of movement of the measuring piston comprise at least one first and one second changing element acting at the respective end of said measuring tube.

17. A flow meter as defined in claim 16, wherein said first time is designed to be determined on the basis of a respective switching time for said first and second changing elements.

18. A flow meter as defined in claim 16, wherein, when switching time for a first of said changing elements exceeds the switching time for a second of said changi elements, a control signal is emitted to said second changing element with a delay corresponding to said difference in the switching time.

19. A measuring method for measuring a fluid with a flow meter comprising a measuring tube having a measuring piston movably arranged in said measuring tube, and elements for changing the direction of movement of the measuring piston in said measuring tube, wherein said measuring piston, when measuring, is designed to be moved in said measuring tube under the influence of said fluid, wherein the method comprises:

detecting the movement of the piston and the direction of the movement in said measuring tube, and detecting when the piston is situated in at least one of its reversing areas before the measuring piston has reached the extreme point of the reversing area, so as to afford a substantially continuous detection of the flow of said fluid wherein the elements for changing direction of movement of the measuring piston can be set to a first state and a second state, wherein the direction of movement of the measuring piston is changed by changing state of the elements for changing the direction of movement of the measuring piston, wherein, when measuring, the direction that represents the intended direction of movement of the piston is changed to an opposite direction, when changing state of said elements for changing the direction of movement of the measuring piston, wherein a movement in an opposite direction to the intended direction of movement of the piston is designed to be subtracted from the cumulative movement of the piston.

20. A measuring method as defined in claim 19, wherein said flow meter comprises a valve arrangement for changing the direction of movement of the piston, wherein the method further consists in:

changing the state of the valves if the piston is situated in a reversing area and the movement of the piston is towards the extreme point of the reversing area.

21. A measuring method as defined in claim 19, further comprising the detection of the actual reversal point of the piston from directional information relating to the movement of the piston in a reversing area, wherein said reversal point is used to define the positive direction of movement of the piston.

\* \* \* \* \*